Aug. 30, 1927.
D. O. SCHUSTER ET AL
1,641,099
CIRCUIT CLOSER FOR MOTOR VEHICLES
Filed Dec. 16, 1920
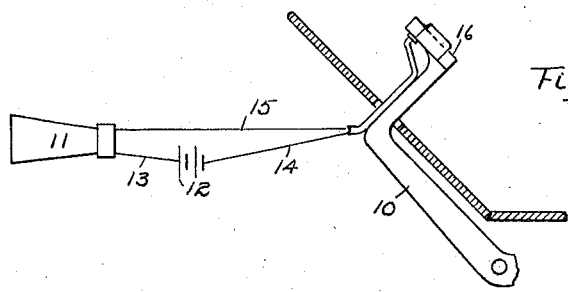
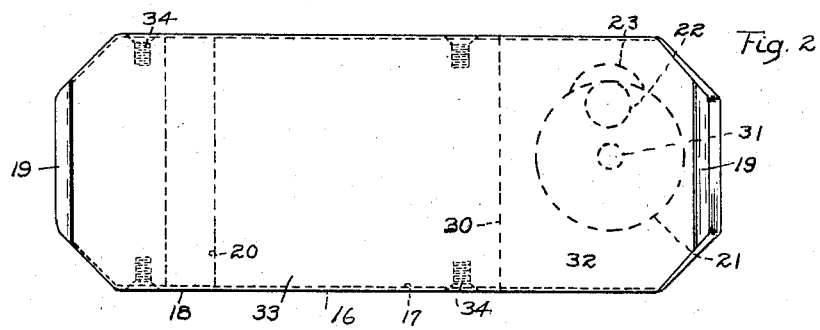
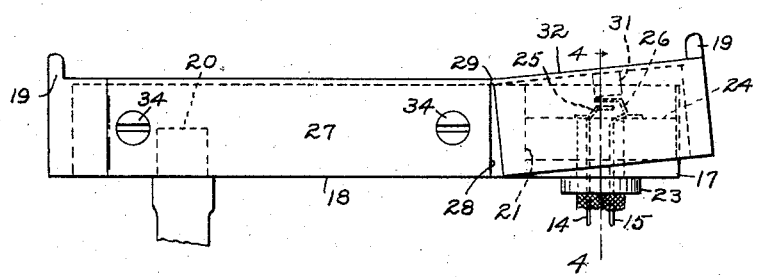
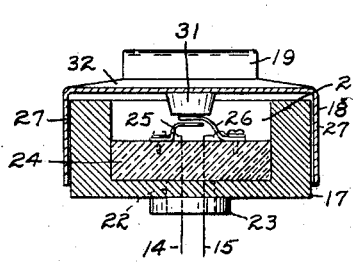
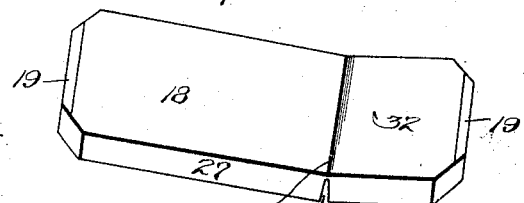
INVENTORS
D. O. Schuster and
H. H. Gerke
ATTORNEY Patented Aug. 30, 1927.

1,641,099

UNITED STATES PATENT OFFICE.

DIEDRICH O. SCHUSTER AND HERMAN H. GERKE, OF FORT WAYNE, INDIANA.

CIRCUIT CLOSER FOR MOTOR VEHICLES.

Application filed December 16, 1920. Serial No. 431,081.

The invention relates to combined controlling and signaling apparatus for motor vehicles.

At the present time motor vehicles generally are equipped with an electrically operated signal of one type or another, the controlling switch for which is installed on the steering wheel or column or other part of the vehicle. To operate the switch the driver is required in most installations to remove one of his hands from the steering wheel and place it on the switch actuating element. On many occasions, especially in an emergency, the driver requires both hands to steer the vehicle and to sound the signal would not only be disconcerting but dangerous.

The object of the invention is to provide a simple apparatus operable by the driver's foot by which he may control the speed of the vehicle and selectively or simultaneously sound the signal.

The invention consists in a pedal having a single controlling means incorporated or associated therewith, and operative either selectively to control the vehicle or to sound the signal or simultaneously to control the vehicle and sound the signal.

In the accompanying drawings we have illustrated an embodiment of the invention in simple form in which Figure 1 is a side elevational view of one of the controlling levers of a motor vehicle and signalling device having the invention applied thereto; Fig. 2 a plan view of the pedal; Fig. 3 a front elevational view of the pedal; Fig. 4 a cross-sectional view on line 4—4 of Fig. 3, and Fig. 5 a perspective view of the pedal showing the movable portion of the casing or switch arm of the signalling switch.

Referring to the exemplification of the invention illustrated in the drawings, 10 indicates one of the controlling levers of the motor vehicle, preferably the brake lever; 11 an electrically operated signal or horn and 12 a battery. Wire 13 is connected to the signal and to the battery and wires 14 and 15 connected to the battery and to the signal respectively are led to the upper end of the lever 10. A pedal 16 is secured to the upper end of lever 10 and consists of a body 17 of suitable material and a casing or shell 18 of suitable material, the shell being a finishing member for the body. Upstanding flanges 19 are formed or secured at opposite ends of the pedal for the obvious purpose of preventing the driver's foot from sliding off the pedal. A channel 20 is formed in the underside of body 17 in which the upper end of the lever 10 is secured, the channel being shaped to conform to the shape of said upper end of the lever, or the lever may be secured to the pedal in any approved manner. Preferably the lever is secured to the body at one end thereof, and a socket or recess 21 is formed at the opposite end of the body which opens at the upper side of the body. The bottom of the socket is apertured at 22 and an insulating sleeve 23 is secured in the aperture. An insulating member 24 is suitably secured in the socket and supports two contacts 25 and 26 normally separated and to which wires 14 and 15 are connected respectively, the wires being passed through sleeve 23 and through an opening formed in insulating member 24.

At a suitable point in opposite depending walls 27 of the shell or casing 18 the same are slotted as at 28 to form a hinge 29 substantially along broken line 30 of Fig. 2, and a button 31 of insulating material is secured to the under side of portion 32 of the shell. Preferably the shell, at least between flanges 19, is formed of resilient material, such as spring steel or brass, and is so formed that portion 32 thereof slopes upwardly from the hinge toward flange 19; hence by depressing the portion 32 button 31 closes contact 26 on contact 25 thereby completing the electric circuit from the battery to the signal. Portion 33 of the casing is secured to body 17 as by screws 34 and is of sufficient length to place his foot thereon and depress the pedal without depressing portion 32. To sound the signal without depressing the pedal the driver places his foot on the pedal and shifts the foot onto portion 32 and presses it downwardly, there being sufficient resistance opposing the lever 10 to permit of the depression of the portion or switch member 32 without appreciably moving the pedal as a whole. If the driver desires to operate the mechanism connected to the lever and also sound the signal he places his foot on the pedal and shifts it onto the switch operating member 32 and depresses the entire pedal just as if he were operating the lever alone. It is a very simple matter for the driver to shift his foot sufficiently to engage member 32.

Any desirable form of pedal may be used and any desirable form of hinge by which to connect the switch operating member to the pedal proper may be used, the essential feature of the invention being that the pedal and switch operating member shall be so associated that the driver may select which of the two he will operate or may operate both simultaneously.

It will be apparent that the pedal may be attached to the clutch lever or any other controlling lever on the machine as well as to the brake lever, provided such lever is operated by the foot of the driver.

What we claim is:

1. In combination with a controlling foot pedal of a motor vehicle, a pair of contacts supported on and insulated from the pedal, a casing secured to the pedal having a resilient portion thereof above the contacts and adapted to be depressed by the foot to engage the contacts for closing an electrical circuit at said contacts.

2. In combination with a foot pedal of a motor vehicle having a cavity therein, a pair of normally separated contacts supported in the cavity and insulated from the pedal, a casing secured to the pedal having one end portion resilient and loose on the pedal and normally inclined upwardly and a member secured to the said loose portion and adapted, when said portion is depressed by the foot, to cause the contacts to engage to close an electrical circuit.

In witness whereof we have hereunto subscribed our names this 13th day of December, 1920.

DIEDRICH O. SCHUSTER.
HERMAN H. GERKE.